(12) United States Patent
Richdale et al.

(10) Patent No.: US 12,052,352 B2
(45) Date of Patent: Jul. 30, 2024

(54) APPARATUS AND METHOD FOR QUANTUM ENHANCED PHYSICAL LAYER SECURITY

(71) Applicant: ID QUANTIQUE SA, Carouge (CH)

(72) Inventors: Kelly Richdale, Carouge (CH); Bruno Huttner, Lausanne (CH)

(73) Assignee: ID QUANTIQUE SA, Carouge (CH)

( * ) Notice: Subject to any disclaimer, the term of this patent is extended or adjusted under 35 U.S.C. 154(b) by 113 days.

(21) Appl. No.: 17/613,048

(22) PCT Filed: May 6, 2020

(86) PCT No.: PCT/EP2020/062517
§ 371 (c)(1),
(2) Date: Nov. 20, 2021

(87) PCT Pub. No.: WO2020/233988
PCT Pub. Date: Nov. 26, 2020

(65) Prior Publication Data
US 2022/0224523 A1    Jul. 14, 2022

(30) Foreign Application Priority Data
May 23, 2019   (EP) .................................... 19176090

(51) Int. Cl.
*H04L 9/08*   (2006.01)
(52) U.S. Cl.
CPC .......... *H04L 9/0858* (2013.01); *H04L 9/0827* (2013.01)

(58) Field of Classification Search
CPC ... H04L 9/0858; H04L 9/0827; H04L 9/0855; H04B 10/25; H04W 84/06
See application file for complete search history.

(56) References Cited

U.S. PATENT DOCUMENTS

| | | | | |
|---|---|---|---|---|
| 5,528,389 A | * | 6/1996 | Nuss | G06E 1/00 382/280 |
| 6,856,741 B2 | * | 2/2005 | Britz | H04B 10/1125 385/124 |
| 7,260,655 B1 | * | 8/2007 | Islam | H04Q 11/0005 709/252 |
| 7,324,647 B1 | * | 1/2008 | Elliott | H04B 10/70 380/278 |

(Continued)

OTHER PUBLICATIONS

Pugh et al.; "Airborne demonstration of a quantum key distribution receiver payload", 2017, IOP Publishing, Quantum Sci. Technol. 2, pp. 1-11. (Year: 2017).*

(Continued)

*Primary Examiner* — Matthew Smithers
(74) *Attorney, Agent, or Firm* — Thomas Coester Intellectual Property

(57) ABSTRACT

A quantum key distribution (QKD) system comprising: an emitter (110) adapted to generate a QKD free-space signal, a transmitter station (220) adapted to receive the free-space signal from the emitter (110), and a remote QKD receiving station (250) supporting a QKD receiver (160) located at a different location than the transmitter station, wherein the transmitter station is adapted to receive said free space signal from the emitter and to forward said signal through a fiber link (400) to the QKD receiver (160) in said remote QKD receiving station (250).

8 Claims, 3 Drawing Sheets

(56) References Cited

U.S. PATENT DOCUMENTS

| | | | | |
|---|---|---|---|---|
| 8,855,316 B2* | 10/2014 | Wiseman | ............... | H04L 9/0855 |
| | | | | 380/278 |
| 10,371,889 B1* | 8/2019 | Barzegar | ................... | G02B 6/30 |
| 2002/0131130 A1* | 9/2002 | Clark | .................. | H04B 10/1125 |
| | | | | 398/140 |
| 2007/0065155 A1* | 3/2007 | Luo | ..................... | H04J 14/0246 |
| | | | | 398/141 |
| 2008/0152147 A1* | 6/2008 | Xia | ....................... | H04L 9/0858 |
| | | | | 380/279 |
| 2010/0166187 A1 | 7/2010 | Trifonov et al. | | |
| 2011/0019823 A1* | 1/2011 | Townsend | ............. | H04L 9/0852 |
| | | | | 380/256 |
| 2012/0230493 A1* | 9/2012 | Bowes | ................... | H04L 9/0858 |
| | | | | 380/278 |
| 2016/0248586 A1* | 8/2016 | Hughes | .................. | H04L 9/0852 |
| 2017/0346564 A1* | 11/2017 | Wiswell | ............... | H04B 10/614 |
| 2018/0097567 A1* | 4/2018 | LeGrange | ............ | H04B 10/293 |
| 2018/0160373 A1* | 6/2018 | Ravishankar | ...... | H04B 7/18543 |
| 2018/0269991 A1* | 9/2018 | Chaffee | ................ | H04B 10/807 |
| 2018/0367638 A1* | 12/2018 | Gayrard | ..................... | H04L 5/14 |
| 2020/0059358 A1* | 2/2020 | Legré | ...................... | G06N 10/00 |
| 2020/0396067 A1* | 12/2020 | Barker | .................. | H04L 9/0894 |
| 2021/0006337 A1* | 1/2021 | Ling | ..................... | G02F 1/3551 |

OTHER PUBLICATIONS

Wang et al.; "Quantum Key Distribution for Security Guarantees Over Quantum-Repeater-Based QoS-Driven 3D Satellite Networks", 2014, IEEE, pp. 728-733. (Year: 2014).*

\* cited by examiner

Figure 1 – Prior Art

General description of the Trusted Node model of QKD

Figure 2 – Prior Art
The OGS as a trusted node for space QKD

APPARATUS AND METHOD FOR QUANTUM ENHANCED PHYSICAL LAYER SECURITY

The present invention relates to a device and a method for performing enhanced free space Quantum Key Distribution, more particularly the present invention relates to a device for performing secured QKD between a satellite or a high-altitude platform and a ground Quantum Key Distribution receiver.

BACKGROUND OF THE INVENTION

Quantum cryptography or quantum key distribution, in the following also referred to as QKD, is a method allowing the distribution of a secret key between two distant parties, an emitter known as "Alice" and a receiver known as "Bob", with a provable absolute security. Quantum key distribution relies on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy known as "Eve" eavesdropping on a quantum communication channel cannot get information on the key without introducing errors in the key exchanged between the emitter and the receiver thereby informing the user of an eavesdropping attempt.

The encryption devices enable secure transmission of useful payload by performing some kind of symmetric encryption using the keys exchanged by quantum key distribution. Specific quantum key distribution systems are described for instance in U.S. Pat. No. 5,307,410.

QKD is a protocol that allows the exchange of secret keys in the active scenario. In a QKD protocol, the communication channel between the two users is known as a quantum channel. A quantum channel is a communication channel, which transmits quantum particles, typically photons, in a way that conserves their quantum characteristics. There are two sets of parameters, which are used for quantum encoding. One is the polarization of the photons, and the second is the phase, which requires the use of interferometers. Both have their advantages and drawbacks depending on the physical layer of the quantum channel and the type of QKD protocol.

The basic idea behind QKD is that the eavesdropper is allowed to intercept the signal and process it in any way compatible with quantum mechanics. Nevertheless, the legal users, known as Alice and Bob, can still exchange a secure key.

The most well-known protocol for QKD is the BB84 protocol, based on four distinct quantum states, explained in Bennett & Brassard, 1984. Several other protocols have been invented, such as for example:
E91, based on entanglement;
B92 based on only two quantum states, but which require interferometric detection; and
COW, which uses a variant of the phase parameter, and uses time-of-detection for encoding.

Commercial systems for ground QKD, distributed over an optical fiber, have been developed, inter alia by ID Quantique SA. In all practical implementations of ground QKD, the parameter used for quantum encoding is the phase, or a related timing parameter for the COW protocol. The reason is that, as polarization is not conserved in an optical fiber, polarization schemes require complicated and expensive components. On the other hand, interferometric detection is easier to realize in single-mode optical fibers, which is the medium of choice for ground QKD.

One of the most restrictive limitations of ground QKD is the distance limitation. Due to unavoidable loss in the optical waveguide and the fact that optical amplifiers cannot be used in a quantum channel, the distance between Alice and Bob is limited to about hundred kilometers in a commercial setup and up to four hundred kilometers in an academic experiment.

A first solution, which was set up for increasing the distance between Alice and Bob, was the implementation of a Trusted Node (TN). The principle of a trusted node is shown in FIG. 1. In this figure we can see that a trusted node is an intermediary element between Alice and Bob, which communicates with each of them and acts as a key relay. More particularly, the trusted node comprises two complete QKD nodes, say Bernard and Amelie. Bernard receives the QKD signal from Alice and processes it in order to produce a first secure key. Amelie generates a new QKD signal, and sends it to Bob, in order to generate a second independent key. The two independent keys are then collaboratively processed by all actors, in order to generate a final secure key between Alice and Bob. This means that the Trusted Node comprises a Key management system, a QKD receiver for exchanging a key with Alice as well as a QKD emitter for exchanging a key with Bob. Since the information is processed in the trusted node and the keys are available there, the Trusted Node requires to be secured and trusted by both parties. By integrating a number of trusted nodes in a chain, the Trusted Node QKD model can be used to design long-range QKD networks, possibly spanning whole countries. However, as explained above, the distance between the trusted nodes is restricted to about one hundred kilometers. The trusted node model described above cannot cross oceans and cannot provide trans-continental key distribution.

In order to increase the distance range further, the solution is to rely on Free-Space Optical communication (FSO) QKD, where the quantum channel is in free space, which does not have the same loss limitation as optical fibers.

Free-Space Optical communication (FSO) is an optical communication technology that uses light propagating in free space to wirelessly transmit data for telecommunications or computer networking. "Free space" means air, vacuum, or something similar, where the light propagates in a straight line. This contrasts with guided optics, such as optical fibers or more generally optical waveguides, where light is guided and directed by the waveguide. Free-space technology is useful where the physical connections are impractical due to high costs or other considerations.

Like any other type of communications, free-space optical communications requires security to prevent eavesdropping. When one looks into the different security means of Free-Space Optical communications, one can see that several solutions have been investigated in order to provide a solution enabling an emitter and a receiver to share secret information through FSO. Common ones are based on the exchange of secret keys through FSO channels. After their exchange, those keys are used to exchange messages in a secure way (e.g. by means of encryption).

Recently, FSO QKD has been investigated in order to securely exchange a key between an emitter and a receiver in free space, typically between a satellite or a flying drone and a ground-based station.

Even though the principle of FSO QKD has been demonstrated on academic set-ups, it is still a challenging demonstration. In contrast to ground QKD, phase is more difficult to use in free space. Indeed, due to atmospheric distortions, the wave front of the wave is distorted during propagation, which leads to poor interference at the receiver. It is possible to improve this by using adaptive optics mirrors. However, this greatly increases the cost and complexity of a system. In free space, polarization is conserved, which makes polarization-based systems more appealing. However, because of the movement of the receiver with respect to the transmitter, the polarization of the photons is changing during the passage of the satellite, which requires polarization compensating components. Both types of protocols, either based on phase, or on polarization are currently investigated.

Since we accept that free-space QKD, particularly satellite or high-altitude platforms QKD, provides a solution for long-distance QKD, we noted that due to the above consideration, in many instances, it is preferable to install the QKD receiver stations, known as optical ground stations (OGS) in remote locations, for example in mountains, to lower the absorption of the atmosphere, or at least not close to urban centers, to lower the background noise due to stray light. In order to provide keys to end-users, which are typically located in the urban centers, a second QKD link, typically based on optical fibers, has to be added. Therefore, placing the OGS in such location requires it to be a trusted node, which requires protection: As a consequence, the trusted OGS has to include costly and complicated security measures against intrusion, and has to ensure tamper detection.

FIG. 2 schematically illustrates a free-space QKD system, preferably deploying satellites or high-altitude platforms, according to prior art, where OGS is a trusted node, which provides keys to a ground QKD network. The system 100 comprises a satellite, or more generally a high-altitude platform 110, linked via a free-space channel 300 to a trusted optical ground station 150 which is physically protected against tampering. Inside the optical ground station, a telescope 130 receives the signal transmitted by the satellite 110, the signal is then processed to a QKD receiver 160. The other elements are similar to the ones in FIG. 1, which shows a fiber-based trusted node.

Examples of free space QKD implementations can be found in R. Bedington et al. "Progress in satellite quantum key distribution", https://arxiv.org/abs/1707.03613v2, or in J-P Bourgoin et al. "A comprehensive design and performance analysis of LEO satellite quantum communication", https://arxiv.org/abs/1211.2733

Alternatively, according to prior art, in order to overcome the need of costly and complicated securities measures for an OGS located far from the end user, such OGS is installed at the QKD receiving station. In this case, it would typically be inside an urban center, where the keys will be directly used. However, this configuration lowers the quality of the free-space channel delivering the signal from the satellite, and reduces the number of secret keys, which can be distributed during each pass of the satellite.

Therefore, there is a need for a free-space QKD system and method, preferably deploying satellites, or alternatively high-altitude platforms, which ensures good quality of the transmitted signal, and a high number of keys, while, at the same time, avoiding the OGS to be a trusted node.

In fact, the trusted node requirement for the OGS implies costly and sophisticated security measures to ensure tamper security, which is extremely important for the correct use of the QKD system.

SUMMARY OF THE INVENTION

The invention is based on the general approach of a free-space QKD apparatus exploiting a hybrid quantum channel which comprises both a free space section and an optical fiber coupled by a fiber coupling element.

The general idea of the invention is that the OGS is separated from the final QKD receiving station, which contains the QKD receiver, in such a way that the OGS itself does not have to be a trusted node. We now refer to the OGS as a transmitter station. Its role is to receive the free-space optical signal and transmit it to the QKD receiving station.

With the hybrid quantum channel system of the present invention, the transmitter station can be placed in the desired location maximizing the signal quality, for example in altitude, and the QKD receiver can be located inside an urban center, where the keys will be directly used.

Particularly, with this system the quantum channel is extended from the satellite or high-altitude platform, through a free-space link, to the transmitter station, which in turn transmits the signal through an optical fiber to the QKD receiver, where the secure keys are generated.

In any case, this system will not modify the paradigm of QKD because, an eavesdropper along the hybrid channel, i.e. free-link plus fiber-link, will still be detected, since it will modify the quantum state.

Thanks to the present invention, the transmitter station does not have to be a trusted node anymore, therefore it is even possible to locate the transmitter station at even better location. Typically, more remote and/or at a higher altitude positions for the transmitter station, without adding the complexity linked to an extra trusted node, and further enhancing the quality of the QKD performances.

BRIEF DESCRIPTION OF THE DRAWINGS

The invention will be described with reference to the drawings, in which the same reference numerals indicate the same feature. In particular.

DETAILED DESCRIPTION OF THE INVENTION

The invention will be described, for better understanding, with reference to a specific embodiment. It will however be understood that the invention is not limited to the embodiment herein described but is rather defined by the claims and encompasses all embodiments which are within the scope of the claims.

Figure 1:
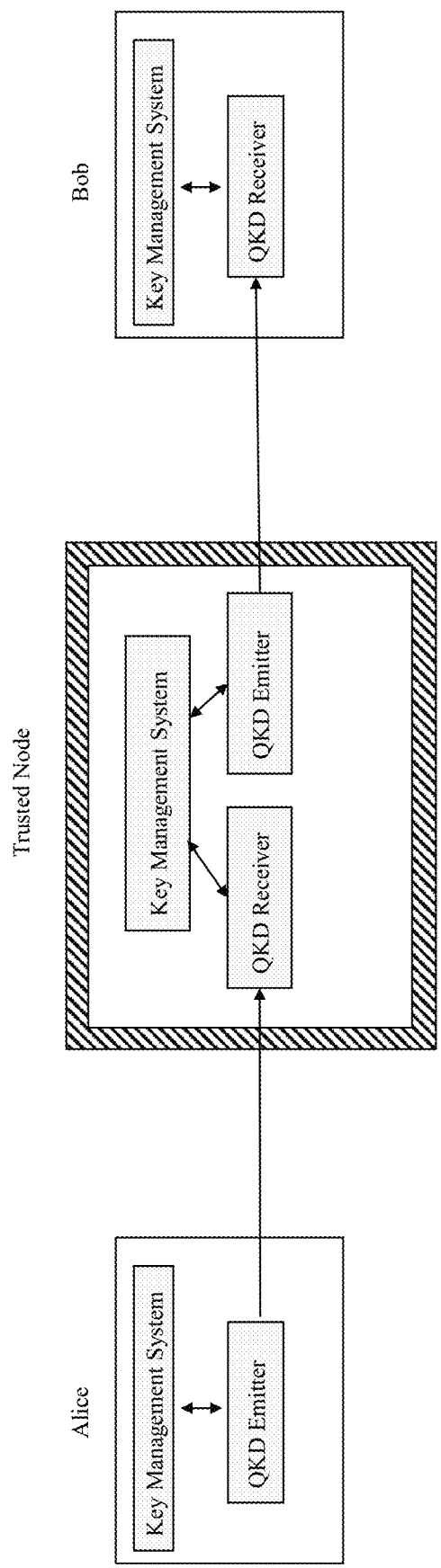
FIG. 1 is a schematic representation of the principle of a Trusted Node.
Figure 2:
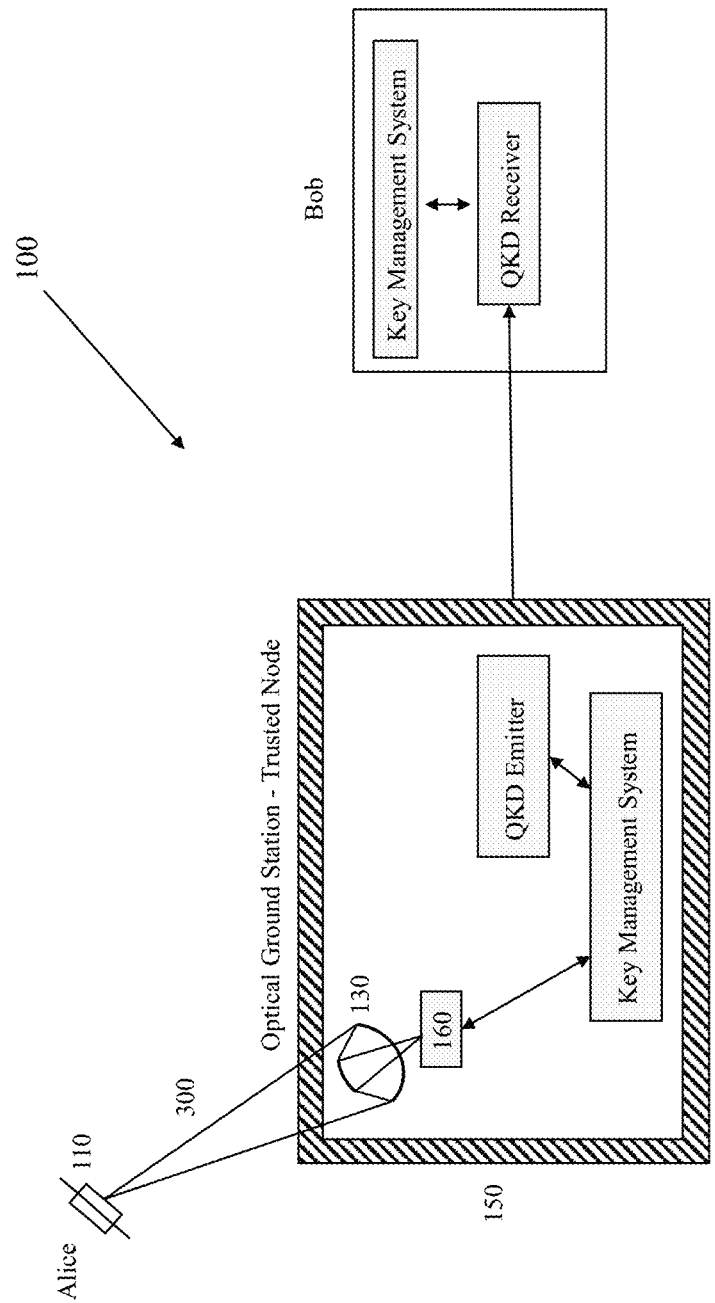
FIG. 2 is a schematic representation of a conventional Free-space QKD system where the OGS is a trusted node.
Figure 3:
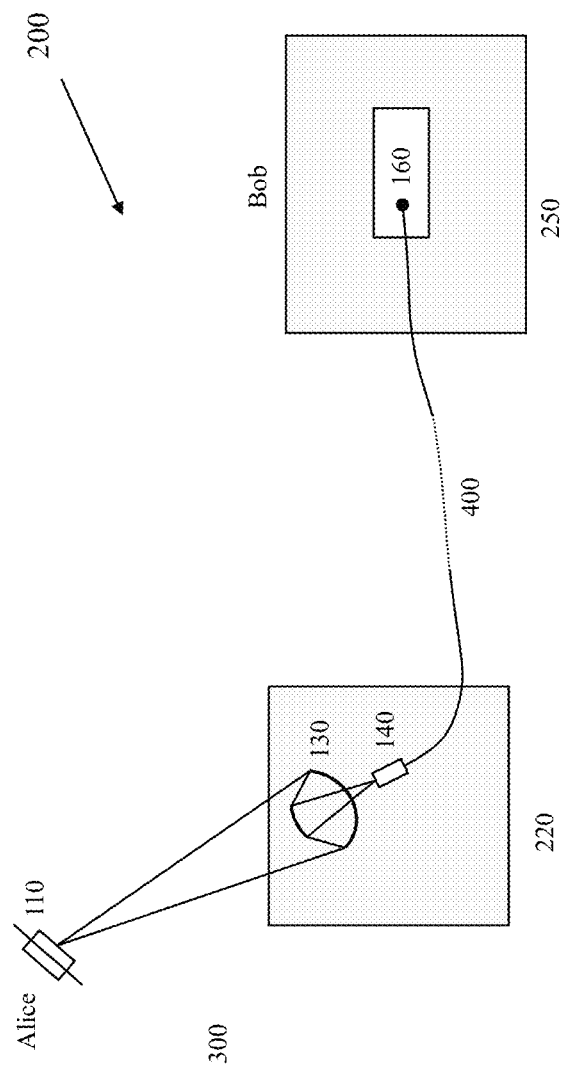
FIG. 3 is a schematic representation of a Free-space QKD system according to the present invention.

FIG. 3 schematically illustrates a preferred embodiment of the invention which is a quantum key distribution (QKD) system 200 wherein an emitter, preferably a high-altitude platform 110, more preferably a satellite or the same, is linked to a transmitter station, preferably an optical ground station (OGS) 220 via a free-space link 300. In this embodiment, the OGS 220 is preferably located at an optimal location such as at high altitude and away from an urban center for maximizing the signal quality. The transmitter station 220 contains a telescope 130 and a fiber coupling 140 for directing the free-space received optical signal into an optical fiber 400 without processing it. As shown, the transmitter station 220 is connected to a remote QKD Receiving Station 250 supporting a QKD receiver 160 via a fiber link 400, which is directly connected to the QKD receiver 160 where the QKD receiver is preferably located far away, such as 30 km or more, from the transmitter station. In this regard, the fiber 400 has a predetermined length permitting avoiding the trusted node requirement for the transmitter station 220 and guarantees the security and the high quality of the quantum keys.

With this system 200, the light from the free-space channel 300 is directed to the fiber coupling 140 so as to be directly coupled, with the fiber coupling 140, without QKD process, into a low loss fiber 400 within the transmitter station 220 and then sent from the transmitter station 220 to the QKD receiver 160 through the fiber.

Typically, to enable long-distance distribution, the fiber 400 should be a Single Mode Fiber (SMF), and the light should be at a wavelength corresponding to a low-loss window in the fiber, typically the O-band (around 1310 nm) or the C-band (around 1550 nm).

Due to atmospheric disturbances, the wavefront of the light arriving at the transmitter station 220 is distorted. Distortions also evolve in time. Therefore, in order to couple it into a SMF, adaptive optics are preferred.

The light coupled into the SMF is then transported to the final QKD receiving station 250 hosting the QKD receiver 160, possibly several kilometers away, preferably ranging from a few hundred meters, corresponding to the transmitter station 220 being located for example on the top of a building, to several tens of kilometers, corresponding to the transmitter station being located away from a urban location.

The overall key distribution channel is therefore a hybrid channel, consisting of a free-space section 300, from the satellite 110 to the transmitter station 220, and an optical fiber-based section 400, which transports the light from the transmitter station 220 to the final QKD receiving station 250. Typically, the final receiving station 250 should be at the location of the end-user, who uses the keys for cryptographic purposes while the transmitter station 220 shall be located at optimal location in terms of signal quality, e.g. at high altitude and away from urban disturbance.

In this way, no key is generated at the transmitter station 220 but only at the QKD receiving section 250, after having passed through the whole hybrid channel.

As a consequence, the transmitter station 220 does not need to be a trusted node, while, at the meantime, the system is secure against attacks, since any eavesdropper trying to measure the data will perturb the quantum states and will be revealed by the QKD protocol.

Additionally, this implementation allows to select a better position for transmitter station 220, which can yield the following advantages:
1. It increases the availability of the channel, by selecting a location with less cloud cover.
2. It increases the key rate, by lowering the attenuation of the free-space channel (higher altitude and/or less polluted air)
3. It lowers the bit error rate in the channel, by lowering the background noise due to stray light.

All three effects combine to increase the amount a secret key available per pass of the satellite/high-altitude platform, consequently enhancing the performances of the QKD.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used and the different types of protocol which are run.

The invention claimed is:

1. A quantum key distribution (QKD) system comprising:
an emitter (110) adapted to generate a QKD free-space signal, a transmitter station (220) adapted to receive the free-space signal from the emitter (110), and a remote QKD receiving station (250) supporting a QKD receiver (160) located at a different location than the transmitter station,
wherein the transmitter station is adapted to receive said free space signal from the emitter and to forward said signal through a fiber link (400) to the QKD receiver (160) in said remote QKD receiving station (250); and
wherein the transmitter station (220) sends said free-space signal to the QKD receiver (160) without processing it.

2. The quantum key distribution (QKD) system of claim 1, wherein
the emitter (110) is a high-altitude platform (HAP), preferably a satellite.

3. The quantum key distribution (QKD) system of claim 1, wherein the optical fiber (400) is a Single Mode Fiber (SMF) enabling long-distance distribution.

4. The quantum key distribution (QKD) system of claim 1, wherein the light is at a wavelength corresponding to a low-loss window in the fiber, around 1310 nm or around 1550 nm.

5. The quantum key distribution (QKD) system of claim 1, wherein the QKD receiving station (250) is at a distance ranging from a few hundred meters to several tens of kilometer from the transmitter station (220).

6. A quantum key distribution (QKD) system comprising:
an emitter (110) adapted to generate a QKD free-space signal, a transmitter station (220) adapted to receive the free-space signal from the emitter (110), and a remote QKD receiving station (250) supporting a QKD receiver (160) located at a different location than the transmitter station,
wherein the transmitter station is adapted to receive said free space signal from the emitter and to forward said signal through a fiber link (400) to the QKD receiver (160) in said remote QKD receiving station (250); and
wherein the transmitter station (220) is not a trusted node, and
wherein no setup message is required to be sent to the transmitter station in advance of the OKD free-space signal.

7. A quantum key distribution (QKD) system comprising:
an emitter (110) adapted to generate a QKD free-space signal, a transmitter station (220) adapted to receive the free-space signal from the emitter (110), and a remote QKD receiving station (250) supporting a QKD receiver (160) located at a different location than the transmitter station,
wherein the transmitter station is adapted to receive said free space signal from the emitter and to forward said signal through a fiber link (400) to the QKD receiver (160) in said remote QKD receiving station (250); and
wherein transmitter station (220) is an optical ground station comprising a telescope (130) and a fiber coupling (140) for directing the free-space received optical signal into an optical fiber (400).

8. A quantum key distribution (QKD) system comprising:
an emitter (110) adapted to generate a QKD free-space signal, a transmitter station (220) adapted to receive the free-space signal from the emitter (110), and a remote QKD receiving station (250) supporting a QKD receiver (160) located at a different location than the transmitter station,
wherein the transmitter station is adapted to receive said free space signal from the emitter and to forward said signal through a fiber link (400) to the QKD receiver (160) in said remote QKD receiving station (250); and
wherein the transmitter station (220) is located at a high altitude and/or non-urban location.

* * * * *